Dec. 3, 1935.  E. GOBEIL  2,023,015
FRONT DRIVE SNOWMOBILE
Filed Feb. 4, 1933   2 Sheets-Sheet 1
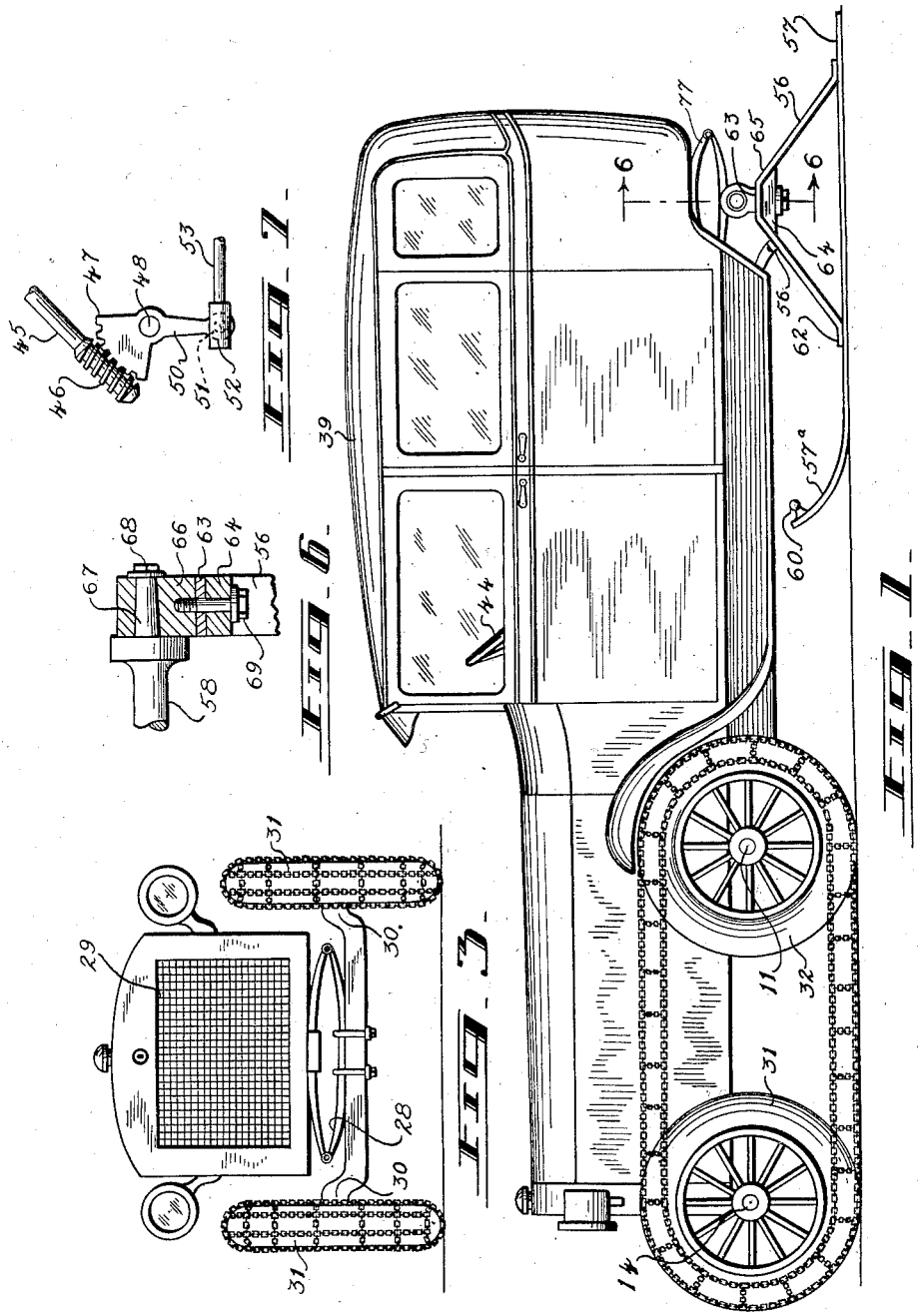
INVENTOR
Eugene Gobeil
BY
ATTORNEY

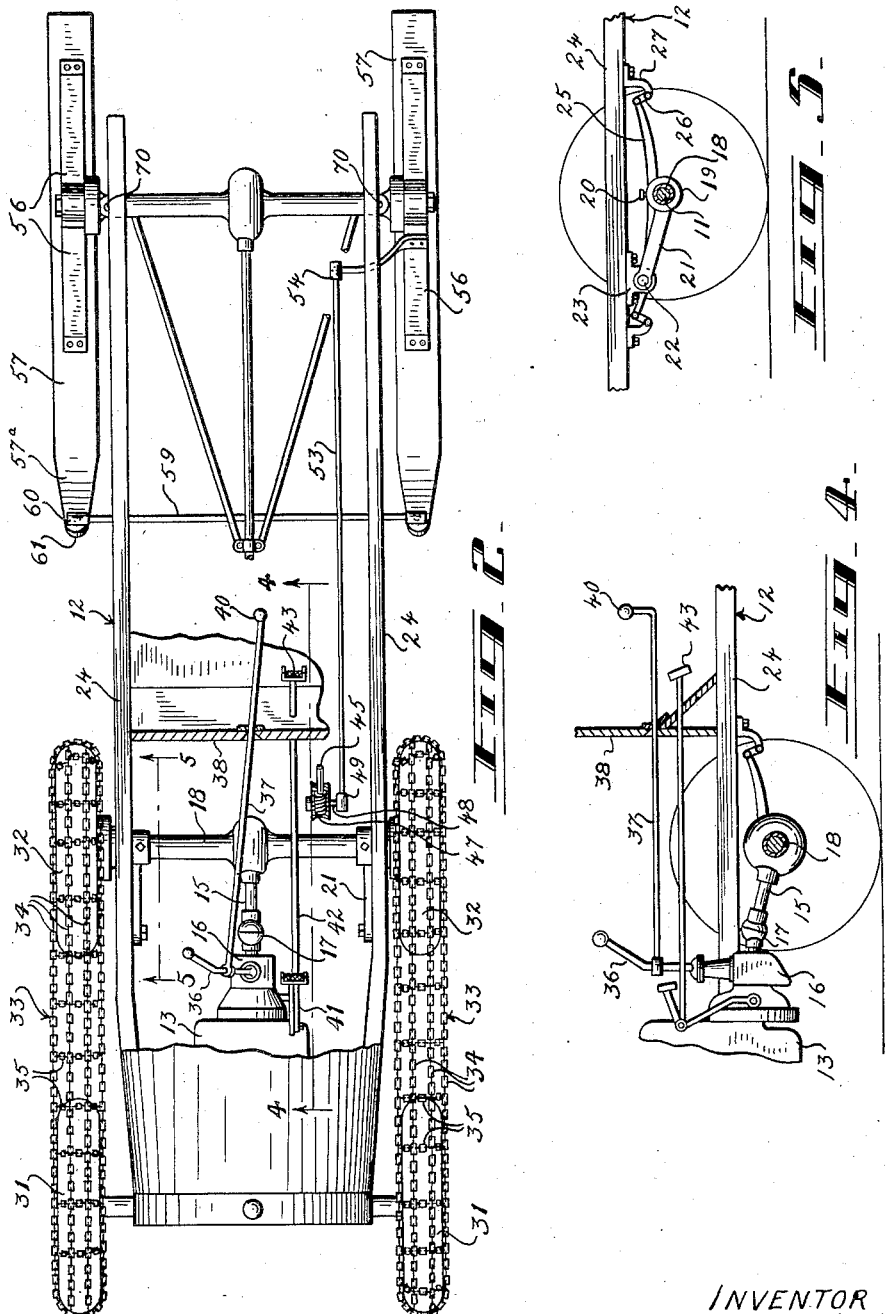

Patented Dec. 3, 1935

2,023,015

UNITED STATES PATENT OFFICE 2,023,015

FRONT DRIVE SNOWMOBILE

Eugene Gobeil, Otterburne, Manitoba, Canada

Application February 4, 1933, Serial No. 655,240

1 Claim. (Cl. 180—5)

This present invention relates to certain new and useful improvements in a front drive snowmobile.

The primary object of the invention resides in the provision of a front drive snowmobile which is of generally improved and simplified construction and operation and which is efficiently steered by rear steering rudders.

The invention has for another object the provision of a front drive snowmobile of the character stated having a front traction drive operated through a transverse differential drive shaft operated direct from the motor power shaft and located beneath the forward portion of the chassis.

A further object of the invention resides in the provision of a front drive snowmobile of the character stated in which the front traction drive is located so as to support the weight of the engine and other parts arranged at the forward end of the snowmobile while the weight of the body and the occupants thereof is borne principally by the rear steering rudders.

The invention has for a still further object the provision of a front drive snowmobile of the character stated with all of the operative parts arranged with the controls therefor within ready reach of the operator located in the closed body of the snowmobile and thus protected from exposure while operating the snowmobile.

The invention has for a still further object the provision of a front drive snowmobile of the character stated which is not only simple and inexpensive in construction as well as highly efficient in operation but may be manufactured at a reasonable cost and retailed at a popular price with good profit, thus providing a commercially attractive proposition.

To the accomplishment of these and related objects as shall become apparent as the description proceeds, the invention resides in the construction, combination and arrangement of parts as shall be hereinafter more fully described, illustrated in the accompanying drawings, and pointed out in the claim hereunto appended.

The invention will be best understood and can be more clearly described when reference is had to the drawings forming a part of this disclosure, wherein like characters indicate like parts throughout the several views.

In the drawings:—

Figure 1 is a side elevation of the improved front drive snowmobile;

Figure 2 is a plan view of the same with the body and a part of the engine casing broken away, for the sake of clearness;

Figure 3 is a front elevation of the snowmobile as shown in Figure 2;

Figure 4 is a longitudinal vertical section, taken substantially on the plane of line 4—4 of Figure 2, looking in the direction indicated by the arrows;

Figure 5 is a similar view taken substantially on the plane of line 5—5 of Figure 2, looking in the direction indicated by the arrows;

Figure 6 is a fragmentary vertical transverse section, taken substantially on the plane of line 6—6 of Figure 1, looking in the direction indicated by the arrows; and Figure 7 is a fragmentary detail elevation, showing a portion of the rear steering rudder operating mechanism.

Referring more in detail to the drawings, it is to be noted that a differential drive axle 11 is mounted transversely beneath the chassis 12, a short distance rearwardly of the motor 13 which is carried on the forward portion of the chassis 12 and rearwardly of the front axle 14, a power transmitting shaft 15 being connected with the motor or engine shaft 16 by a universal joint 17. The shaft 15 is extended rearwardly into the differential drive axle casing 18 for operating the differential drive axle 11. The opposite ends of the casing 18 are supported in collar bearings 19 and prevented from moving longitudinally or rotating therein by set screws 20 or other appropriate means. These collar bearings 19 are carried on bracket arms 21 which are fulcrumed at one end on fulcrum bolts 22 carried in brackets 23 mounted on the underface of the longitudinal side frame bars 24 of the chassis 12. Resting across the ends of the casing 18, outwardly of the bearing collars 19 are the convex lower faces of arcuate leaf springs 25 which have their opposite ends connected by link connections 26 with the brackets 27 suspended from the underside of the longitudinal side frame members 24 of the chassis 12, the springs 25 serving as shock absorbing springs for absorbing shocks incident to movement of the snowmobile over a rough surface. An appropriate shock absorbing spring 28 which is shown as a bolster spring, is also located between the front axle 14 and the forward end of the chassis 12, the radiator 29 in front of the engine 13 being shown as supported directly above the shock absorbing spring 28. On the upwardly offset end 30 of the front axle 14, the front wheels 31 of the snowmobile are rotatably mounted and the wheels 32 on the extended ends of the transverse drive axle 11 are immediately behind the front wheels 31. On each side of the machine, a flexible traction drive chain 33 is extended around the wheels 31 and 32 for that side of the snowmobile. The traction drive chain 33 is of an appropriate type, being shown as composed of a plurality of longitudinal chain sections 34 connected by spaced transverse chain sections 35, all of the chain sections 34 and 35 being of the conventional elongated link type. The type of chain sections employed in the traction drive chain 33 may be varied, however, as desired.

As the clutch lever 36 is located between the engine or motor 13 and the universal joint 17, between the shafts 15 and 16, an extension clutch lever control rod 37 is extended rearwardly from the clutch lever 36 and through the dash board 38 with its free rear end terminating within the closed body 39 of the snowmobile and within ready reach of the operator, a knob 40 or the like being located on the free rear end of the rod 37. Mounted on the foot pedal rod 41 is a second extension rod 42 extended rearwardly through the dash board 38 and terminating within the closed body 39 of the snowmobile with an auxiliary brake operated pedal 43 on its rear extremity, within ready reach of the operator.

Steering of the snowmobile is controlled by a conventional steering wheel 44 also located within the closed body 39 and carried on the upper end of an inclined steering rod 45 having a worm gear 46 on its lower extremity meshing with and actuating the segmental gear 47 carried on a stub shaft 48. This stub shaft 48 is mounted in appropriate supporting bearings 49. The segmental gear 47 has a depending arm 50 provided with a lateral extension 51 on which is fulcrumed the forward end 52 of a rearwardly directed steering rudder actuating rod 53, the said forward end 52 is shown as being enlarged. The other or rear end of the rod 53 is connected by a universal joint connection 54 with one end of the bar 55 which is twisted upon itself and has its other end secured on one of the substantially triangular runner suspending brackets 56 for the pair of rear steering sleigh runners 57 which are suspended beneath the ends of the rear axle 58. The rear steering sleigh runners 57 have their forward ends 57a turned upwardly and connected by a transverse bar 59 extended across the upturned forward end 58 with the extremities of the cross bar 59 secured in bearings 60 provided on said rear steering sleigh runners 57. It is also to be noted that the upwardly curved forward ends 58 of the rear steering runners 57 are tapered or beveled on their opposite edges and terminate in rounded extremities 61. It is also to be noted that the sleigh runners 57 are rearwardly of the intermediate wheels 32 and the forward wheels 31 and follow the same when the motor sleigh is travelling in a straight forward direction. The suspending brackets 56 for the rear steering sleigh runners 57 have the lower extremities 62 of their diverging legs turned outwardly and securely fastened on the upper face of the respective runners 57. The central portions 63 of the suspending brackets 56 are flattened and extended over bearing blocks 64 having opposite beveled faces 65 on which the diverging legs of the suspending brackets 56 rest while bearing members 66 rest on the upper face of the flattened or horizontal central portions 63 of the respective suspending brackets 56. The bearing members 66 are mounted on the reduced spindle ends 67 of the rear axle 58 and prevented from moving off of said spindles 67 by appropriate lock nuts 68 secured on the extended extremities of said spindle ends 67. A lock bolt 69 is extended upwardly through each bearing block 64, through the central portion 63 of the suspending bracket 56 resting thereon and into the bearing members 66 resting on said central portion 63 of the suspending bracket 56 for each rear steering sleigh runner 57, thereby firmly uniting these parts for efficient operation on the rear axle 58. The opposite ends of the rear axle 58 are pivotally mounted on the main portion thereof by means of vertical pivot members 70 so that the rear steering sleigh runners 57 may be readily turned in either direction for steering the snowmobile. It is also to be understood that the rear end of the closed body 39 and the chassis 12 rest resiliently over the rear axle 58 with shock absorbing springs 71 of the bolster type or any other preferred type, interposed therebetween, for absorbing the shock incident to movement of the sleigh runners 57 over uneven surfaces.

It may here be pointed out that the rear axle 58 in Figure 2 appears to be provided with a differential housing and brace rods. These have no bearing on the invention however. They are merely the conventional parts that occur on the usual motor car chassis and which may be left intact when converting the same to a snowmobile. They could be removed but are found in the illustration to show that the present device can be readily applied to a car chassis.

As the construction of the device has thus been described in detail, brief reference is now had to its use and modes operandi: The snowmobile is operated in a manner similar to the front drive automobile and the steering wheel 44 and other controls are located convenient to the operator within the closed body 39. By proper manipulation of the steering wheel 44, the snowmobile is readily steered as desired through the rear steering sleigh runners 57 operated in unison.

From the foregoing description taken in connection with the accompanying drawings, it will be manifest that a front drive snowmobile is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limitative or restrictive sense.

Having thus described the invention, what is claimed is:—

A front drive snowmobile including a chassis; a body mounted on said chassis; an engine mounted on said chassis; forward and intermediate axles suspending beneath said chassis; forward and intermediate ground wheels carried on said forward and intermediate axles; front traction drive chains operating around said forward and intermediate ground wheels on opposite sides of the snowmobile; a differential on said intermediate axle; driving connections between said engine and said differential; a universal joint within said connection; a housing on said differential and intermediate axle; a pair of brackets suspended from opposite sides of said chassis in alignment with said universal joint; a pair of bracket arms mounted on opposite ends of said axle housing with forward ends pivoted to said suspended brackets to swing vertically and axially with said universal joint; a clutch mechanism within said connection; control means for said clutch mechanism operable from within said body; a rear axle suspended beneath said chassis; rear steering sleigh runners carried on said rear axle; connections between said rear steering sleigh runners; operating means for said rear steering sleigh runners; and control means for the last mentioned operating means operable from within said body.

EUGENE GOBEIL.